March 26, 1935. A. J. MICHELIN 1,995,575
SAFETY DEVICE FOR RAILWAY VEHICLES WITH PNEUMATIC TIRES
Original Filed Nov. 10, 1930
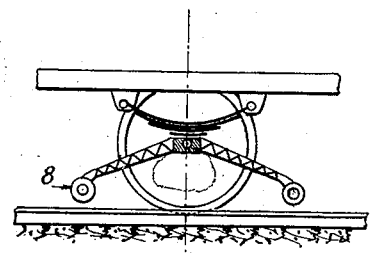
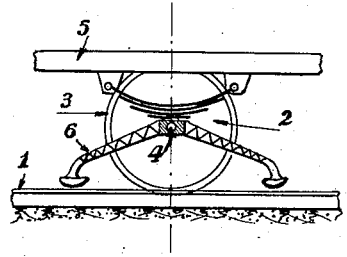
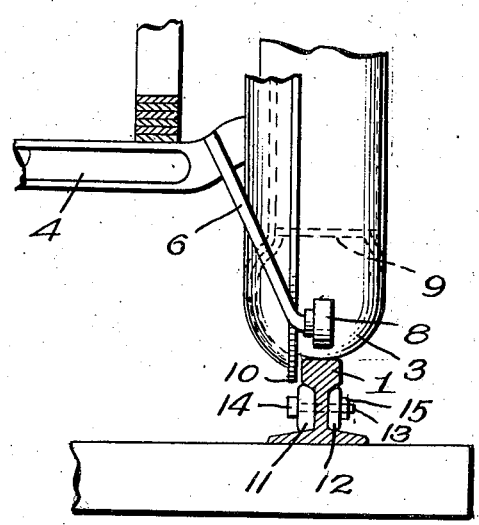
Inventor,
André J. Michelin
By Henry Orth
Atty.

Patented Mar. 26, 1935

1,995,575

UNITED STATES PATENT OFFICE 1,995,575

SAFETY DEVICE FOR RAILWAY VEHICLES WITH PNEUMATIC TIRES

André Jules Michelin, Paris, France, assignor to Michelin et Cie, Clermont-Ferrand, France, a corporation of France Application November 10, 1930, Serial No. 494,769. Renewed April 4, 1932. In France November 21, 1929

1 Claim. (Cl. 105—216)

My invention has for its object a safety device for railway vehicles the wheels of which are fitted with pneumatic tires.

Said device is intended to avoid any damage to the fish joint bolts or other projections such as are ordinarily associated with the rails or tracks that might occur as a consequence of the abnormal running of the wheel in the case of the pneumatic tire becoming deflated.

The device according to the present invention also avoids, when the tire is punctured, any damages to the tire and to the wheel that might result therefrom.

According to my invention, a rigid metallic frame is secured to the car axles or to the car frame, said rigid metallic frame carrying at its ends skids or rollers which are adapted to slide or roll on the rail. When the wheel is running under normal circumstances, said skids or rollers are suspended at a certain distance above the rail, for instance 5 or 20 millimeters. If, on the contrary, for some accidental cause (such as the bursting of a tire) the wheel happens to subside, this subsiding is limited to the 5 or 20 millimeters that have been above referred to, since the downward motion of the wheel will be stopped as soon as the skids or rollers come in contact with the rail.

It will be readily understood that the device according to the present invention greatly reduces the disadvantages resulting from the possibility of the pneumatic tires getting punctured.

Likewise, the device according to the present invention also prevents, as it has already been stated, the shearing of the fish joint bolts or other projections and the damaging of the wheel and its pneumatic tire. The skids or rollers may also fulfill a guiding function if they are provided with guiding surfaces along the inner side of the rail. It is possible, as shown in the appended drawing, to fix a supporting frame to each axle. But a single supporting frame could also be fixed to two axles, in which case the number of skids or rollers would be reduced.

With the foregoing and other objects in view, the invention will be more fully described in connection with the accompanying drawing which is illustrative only, and is semi-diagrammatic in that no attempt is made to give the parts their actual mountings and relative proportions but only to show their locational relations.

Fig. 1 is a lateral view of a safety device according to my invention showing a supporting frame provided with rollers adapted to roll on the frame in case of the tire becoming deflated.

Fig. 2 is a similar view showing a supporting frame provided with skids instead of rollers.

Figure 3 is a vertical transverse section through a rail and a portion of a vehicle showing the improved device.

The vehicle frame is shown in 5, and 4 is the axle connected to said frame through suitable springs. The wheels 2 are fitted with pneumatic tires 3.

To the axles 4 are secured supporting frames 6 carrying at their ends either rollers 8 (as shown in Fig. 1) or skids 7 (as shown in Fig. 2), said rollers or skids being normally suspended at a certain distance above rail 1. In the case of the pneumatic tire getting punctured, said rollers or skids come in contact with the rail and help in supporting the vehicle frame.

Referring more particularly to Figure 3, the pneumatic tire 3, which travels on the rail 1, is shown as mounted upon a rim 9 carried upon the wheel in the usual manner; and this rim supports a guide flange 10 which projects down at the inside of the rail 1 for the purpose of retaining the wheel or tire 3 upon the rail.

The adjoining rail sections are connected together by the fish plates 11 and 12 secured to the rails by the bolts 13 which are provided with bolt heads 14 at one side and nuts 15 at the other side.

When the pneumatic tire 3 becomes deflated through puncture or loss of air pressure, a condition arises which is ordinarily not met with in metallic railway car wheels, in that the guide flange 10 is allowed to descend into contact with the heads 14 of the bolts 13 holding the fish plates upon the sides of the rails. If allowed to do so, the guide flange 10 may shear the heads 14 from the bolts thus allowing bolts 13 and fish plates 11 and 12 to become loose and to jeopardize the safe condition of the road bed, or they may ride up upon the projecting edges of fish plates or other projections either with damage to the wheel of the car or derailment of the car itself.

The improved frame carrying the rollers 8 is provided to avoid this hazard, the rollers 8 contacting with the rail head 1 before the guide flange 10 can reach the bolt heads 14. The improved frames will thus prevent the guide flange 10 from too great descent in the event of loss of tire pressure.

While I have, in the above description, endeavored to disclose what I believe to be an efficient and practical embodiment of my invention, it is to be understood that the invention is not limited by the specific details as shown but that it is subject to many and all structural variation which may express the invention and at the same time come within the scope of the appended claim.

What I claim is:

In combination, a railway vehicle wheel adapted to support the vehicle from and guide it with respect to the heads of rails of modern standard railway tracks connected together by laterally projecting fish plates and bolts and comprising a pneumatic load supporting tire engaging the rail head and a wheel retaining flange projecting radially beyond the tread of the tire as engaged with the rail head sufficiently to normally engage the side of the rail head and thereby guide the vehicle upon the rail projecting laterally from the rails into its plane of movement but below the side of the rail head, but which flange is liable upon deflation of the pneumatic tire to be projected in its plane to an abnormal distance beyond the tread of the tire as engaged with the rail head and thereby to strike said obstructions in its pathway, together with means for limiting such abnormal projection of the flange beyond the tread of the tire to a degree within that at which it may strike said obstructions in its pathway, said means supported from the vehicle projecting radially a fixed distance from the axis of the wheel when the tire is deflated and adapted to react from the rail head.

ANDRÉ JULES MICHELIN.